US012693633B2

(12) United States Patent
Jeanrenaud et al.

(10) Patent No.: US 12,693,633 B2
(45) Date of Patent: Jul. 28, 2026

(54) FORMATION OF A THREE-DIMENSIONAL OBJECT ON A DIAL

(71) Applicant: Rubattel & Weyermann S.A., La Chaux-de-Fonds (CH)

(72) Inventors: Frédéric Jeanrenaud, La Chaux-de-Fonds (CH); Pierre Fritz, Bellerive (CH)

(73) Assignee: Rubattel & Weyermann S.A., La Chaux-de-Fonds (CH)

( * ) Notice: Subject to any disclaimer, the term of this patent is extended or adjusted under 35 U.S.C. 154(b) by 72 days.

(21) Appl. No.: 18/001,550

(22) PCT Filed: Jun. 15, 2021

(86) PCT No.: PCT/EP2021/066146
§ 371 (c)(1),
(2) Date: Dec. 12, 2022

(87) PCT Pub. No.: WO2021/255043
PCT Pub. Date: Dec. 23, 2021

(65) Prior Publication Data
US 2023/0244189 A1 Aug. 3, 2023

(30) Foreign Application Priority Data
Jun. 17, 2020 (EP) .................................... 20180566

(51) Int. Cl.
*G04B 45/00* (2006.01)
*B29C 64/30* (2017.01)
(Continued)

(52) U.S. Cl.
CPC .......... *G04B 45/0076* (2013.01); *B29C 64/30* (2017.08); *B33Y 40/10* (2020.01);
(Continued)

(58) Field of Classification Search
CPC ........ G04B 45/00; G04B 19/10; G04B 19/12; G04B 19/18; G04B 19/103; B29C 64/30; B33Y 40/10; B33Y 40/20; B33Y 80/00
See application file for complete search history.

(56) References Cited

U.S. PATENT DOCUMENTS

| | | | |
|---|---|---|---|
| 2012/0192424 A1* | 8/2012 | Cataldo .................. | B33Y 50/02 |
| | | | 29/896.33 |
| 2017/0220004 A1 | 8/2017 | Bossart et al. | |

(Continued)

FOREIGN PATENT DOCUMENTS

| | | |
|---|---|---|
| CN | 103722172 A | 4/2014 |
| CN | 105708061 A | 6/2016 |

(Continued)

OTHER PUBLICATIONS

UV-LIGA: From Development to Commercialization By Gregoire Genolet et al. in Micromachines, Jul. 23, 2014 (Year: 2014).*

(Continued)

*Primary Examiner* — Alison L Hindenlang
*Assistant Examiner* — Shibin Liang
(74) *Attorney, Agent, or Firm* — Oblon, McClelland, Maier & Neustadt, L.L.P.

(57) ABSTRACT

A deposition method for forming a three-dimensional object on a watch dial and/or a watch bezel that includes at least supplying at least one support and depositing an adhesion layer, an outline of the object is delimited in order to enable a cavity to be formed by the deposition of a plurality of polymer layers, such that said object is formed by filling said cavity by the deposition of at least one finish layer.

5 Claims, 2 Drawing Sheets

(51) Int. Cl.

| | |
|---|---|
| *B33Y 40/10* | (2020.01) |
| *B33Y 40/20* | (2020.01) |
| *B33Y 80/00* | (2015.01) |
| *G04B 19/10* | (2006.01) |
| *G04B 19/12* | (2006.01) |
| *G04B 19/18* | (2006.01) |

(52) U.S. Cl.
CPC ............... *B33Y 40/20* (2020.01); *B33Y 80/00* (2014.12); *G04B 19/103* (2013.01); *G04B 19/12* (2013.01); *G04B 19/18* (2013.01)

(56) References Cited

U.S. PATENT DOCUMENTS

| | | | |
|---|---|---|---|
| 2017/0299973 A1 | 10/2017 | Frauens | |
| 2019/0022926 A1 | 1/2019 | Frauens | |
| 2019/0278182 A1* | 9/2019 | Laforge | ............. G04B 45/0069 |
| 2019/0294118 A1 | 9/2019 | Bossart et al. | |

FOREIGN PATENT DOCUMENTS

| | | |
|---|---|---|
| CN | 105708062 A | 6/2016 |
| CN | 107787271 A | 3/2018 |
| CN | 110244543 A | 9/2019 |
| EP | 3 202 708 A1 | 8/2017 |
| EP | 3 536 826 A1 | 9/2019 |
| JP | 2019-157268 A | 9/2019 |

OTHER PUBLICATIONS

Japanese Office Action issued on Nov. 21, 2023 in Japanese Patent Application No. 2022-573276 (with unedited computer-generated English translation), 9 pages.

International Search Report mailed on Aug. 13, 2021 in PCT/EP2021/066146 filed on Jun. 15, 2021 (2 pages).

Office Action and Search Report issued in Chinese Patent Application No. 202180043274.7 on Feb. 9, 2026.

* cited by examiner

FORMATION OF A THREE-DIMENSIONAL OBJECT ON A DIAL

TECHNICAL FIELD

The present invention relates to a method for forming an object. More particularly, the present invention relates to a method for depositing layers in order to form a three-dimensional object for a watch dial.

TECHNOLOGICAL BACKGROUND

Several techniques exist in the prior art for producing patterns on a substrate. However, these techniques do not allow an object comprising an undercut to be produced.

More specifically, current methods use a directional beam of light to create patterns, the section whereof, i.e. the cross-section whereof, is rectangular or of the polygonal type such as a trapezoid or rhombus.

More complex shapes are not currently possible using these current methods; for example rounded outlines or curved surfaces cannot be created.

SUMMARY OF THE INVENTION

The present invention proposes fully or partially overcoming these drawbacks by providing a deposition method for the formation of an object, preferably for a watch; said object including a perimeter, at least one first surface and/or a volume; said deposition method comprising at least one step of:

Supplying at least one support comprising at least one receiving surface;

Depositing an adhesion layer on said at least one receiving surface;

Delimiting an outline on said deposited adhesion layer; said outline corresponding to said perimeter, to said at least one first surface and/or to said volume of said object;

Forming a cavity along said outline by depositing a plurality of polymer layers on said adhesion layer such that a portion of said adhesion layer equivalent to said perimeter, to said at least one first surface and/or to said volume of said object is opposite, preferably free;

Filling said cavity by depositing at least one finish layer on said opposite, preferably free, portion of said adhesion layer; and, Carrying out a surface treatment on said plurality of polymer layers and said deposited adhesion layer so as to expose said at least one receiving surface of said support.

Thanks to this provision, objects with complex shapes such as rounded outlines or curved surfaces can be created.

According to one embodiment, said object comprises at least one second surface that is more curved than said at least one first surface.

Thanks to this provision, objects with complex shapes such as curved surfaces can be created.

According to one embodiment, said cavity is formed along a median of said object and/or said outline is formed along a median of said object.

According to one embodiment, said median forms an angle with said at least one receiving surface.

According to one embodiment, said object forms an undercut in said plurality of polymer layers or said object comprises an undercut (224).

Thanks to any of the above provisions, objects with complex shapes having an undercut can be created.

According to one embodiment, said cavity is formed by additive manufacturing.

Thanks to any of the above provisions, objects with complex shapes having an undercut can be created.

According to one embodiment, said adhesion layer comprises at least one material selected from among Au, Cu, Ag, In, Pt Pd Ni, Ti, Ta, Cr, Th or an alloy of these materials.

According to one embodiment, said at least one finish layer comprises at least one material selected from among or an alloy of these materials.

Complex shapes can be produced by additive manufacturing thanks to these materials.

According to one embodiment, said surface treatment is carried out by pickling and/or stripping.

Thanks to this provision, said at least one receiving surface of said support has a better visual appearance.

According to one embodiment, said support is made of ceramic.

According to one embodiment, said deposition of said adhesion layer is carried out in contact with said at least one receiving surface.

Thanks to this provision, said at least one receiving surface is made electrically conducting.

The present invention relates to a watch comprising at least one support and an object produced according to said deposition method of said present invention.

According to one embodiment, said at least one support is a dial or a bezel.

BRIEF DESCRIPTION OF THE FIGURES

The invention will be described in more detail hereafter using the accompanying drawings, given by way of examples that are in no way limiting, wherein.

DETAILED DESCRIPTION OF THE INVENTION

Figure 2:
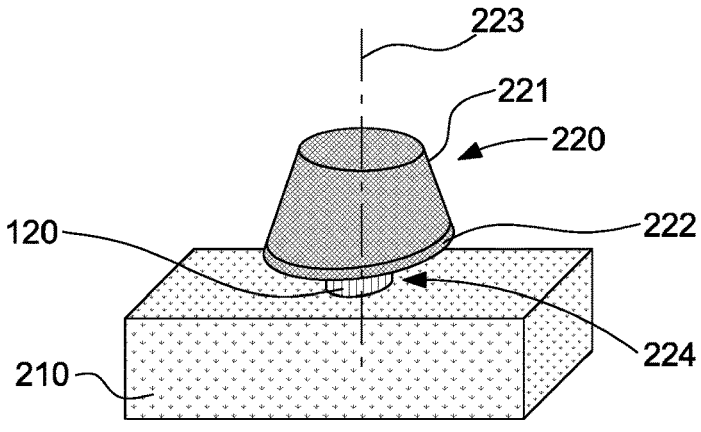
FIGS. 2 and 3 illustrate examples of objects having an undercut 224 and/or a curved surface, and, FIG. 4 shows an example of a watch dial produced according to said deposition method 500.
Figure 3:
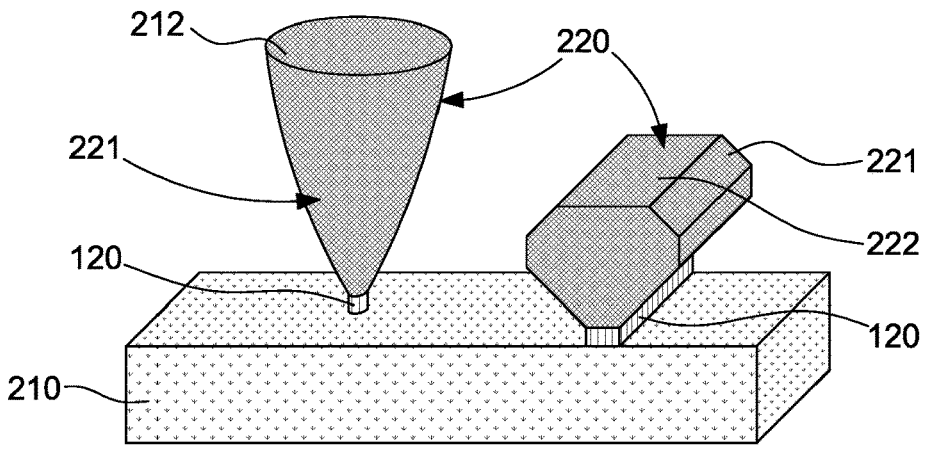
Figure 4:
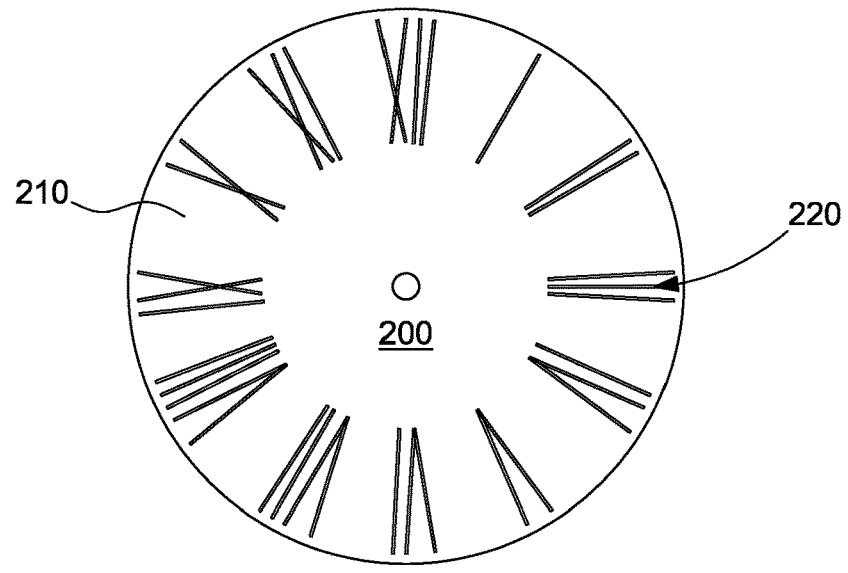

FIGS. 2 and 3 show different objects that are referred to as complex because of their geometries. More specifically, these objects have at least one curved surface and have an undercut 224, which makes it difficult to replicate these shapes on an industrial scale.

More specifically, most current methods use a directional beam of light to create patterns with a rectangular cross-section.

Figure 1:
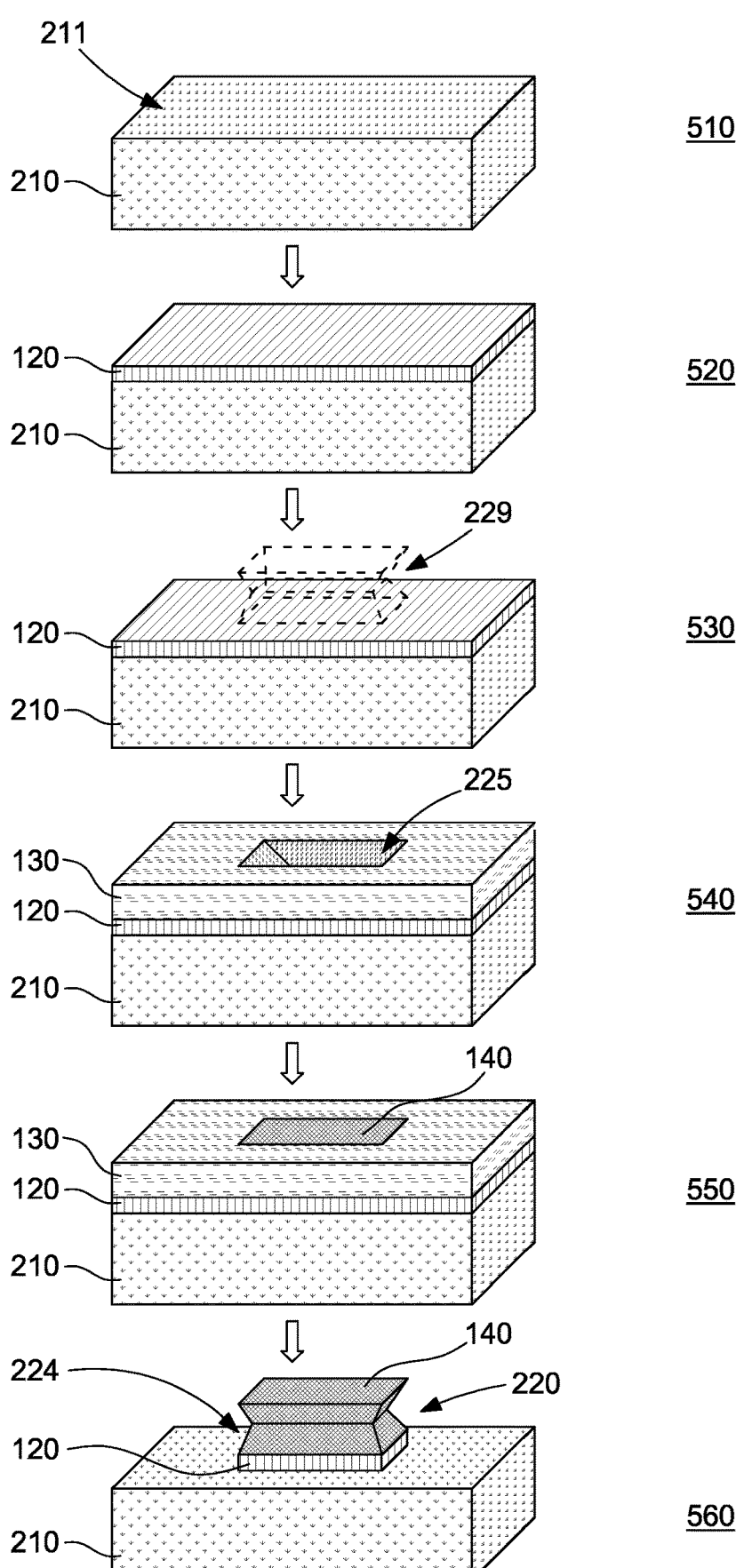
FIG. 1 shows a deposition method 500 according to the invention.

However, curved surfaces procure an appearance that is very popular with users. To this end, the applicant proposes a deposition method 500, visible in FIG. 1, for forming an object 220 on at least one support 210, preferably made of ceramic, which can take the form of a watch dial 210 or a watch bezel 210.

Said object 220 can include a perimeter, at least one first surface 221, at least one second surface 222 that is more curved than said at least one first surface 221 as shown in FIGS. 2 and 3, and/or a volume.

In a first step, said at least one support 210 comprising at least one receiving surface 211 is supplied 510. This is followed by the deposition 520 of an adhesion layer 120, which can be formed of one or more layers using a dry process such as PVD, CVD or PE CVD or ALD, made of at least one material selected from among Au, Cu, Ag, In, Pt Pd Ni, Ti, Ta, Cr, Th or an alloy of these materials, on said at least one receiving surface 211, preferably in contact with said at least one receiving surface 211 so as to render said at least one receiving surface 211 electrically conducting.

A delimitation 530 is carried out to determine an outline 229 of said object 220 on said deposited adhesion layer 120. Said outline 229 corresponds to said perimeter, to said at least one first surface 221, to said at least one second surface 222 and/or to said volume of said object 220. As can be seen in all of the objects 220 shown in FIGS. 1 to 4, an undercut 224 is present. Said undercut 224, which can be positive or negative, cannot be produced with the current methods because the light source is directive and does not allow objects with an undercut to be produced, more particularly on watch dials for example.

Said delimitation 530 of said outline 229 is essential for the formation 540 of a cavity 225 along said outline 229 and, preferably, along a median 223 of said object 220. Although the objects 220 have a median perpendicular to said at least one receiving surface 211, in embodiments, said median 223 can be at an angle to said at least one receiving surface 211.

Said cavity 225 is formed 540 by depositing a plurality of polymer layers 130 by additive manufacturing on said adhesion layer 120 such that a portion of said adhesion layer 120 equivalent to said perimeter, to said at least one first surface 221 and/or to said volume of said object 220 is opposite, preferably free. In other words, said portion of said adhesion layer 120 is not covered with polymer layers 130.

Said cavity 225, on said opposite, preferably free portion of said adhesion layer 120, is filled by the deposition 520 of at least one finish layer 140 comprising at least one material selected from or an alloy of these materials. These materials are selected because they allow complex shapes to be produced by additive manufacturing.

In order to procure an optimal appearance, a surface treatment 560 can be carried out by pickling and/or stripping for example, on said plurality of polymer layers 130 and on said adhesion layer 120 deposited so as to expose said at least one receiving surface 211 of said support 210 and to give a better visual appearance to said at least one receiving surface 211 of said support 210. In cases where the top surface is said at least one second surface 222, the latter, i.e. said at least one second surface 222 will be covered with polymer layers 130, and said surface treatment 560 will remove said plurality of polymer layers 130 present on said top surface without damaging the visual appearance of said at least one second surface 222.

Thus, thanks to this invention, objects with complex shapes such as rounded outlines or curved surfaces and thus watch dials 210 and/or watch bezels 210 with a novel and highly appreciable visual appearance can be created.

The invention claimed is:

1. A deposition method for the formation of an object for a watch; the object including a perimeter, at least one first surface and/or a volume; the deposition method comprising at least one step of:
   supplying at least one support comprising at least one receiving surface;
   depositing an adhesion layer on the at least one receiving surface, said adhesion layer being formed of one or more layers made of at least one material selected from among Au, Cu, Ag, In, Pt, Pd, Ni, Ti, Ta, Cr, Th or an alloy of these materials, so as to render said at least one receiving surface electrically conducting;
   delimiting an outline on the deposited adhesion layer; the outline corresponding to the perimeter, to the at least one first surface and/or to the volume of the object;
   forming a cavity along the outline by depositing, on the adhesion layer, a plurality of polymer layers, such that a portion of the adhesion layer equivalent to the perimeter, to the at least one first surface and/or to the volume of the object is opposite and is not covered by polymer layers;
   filling the cavity by depositing on the opposite portion of the adhesion layer at least one finishing layer comprising at least one material selected from Au, Cu, Ag, In, Pt, Pd, Ni, Ti, Ta, Cr, Th or an alloy of these materials; and
   carrying out a surface treatment on the plurality of polymer layers and the deposited adhesion layer so as to expose the at least one receiving surface of the support,
   wherein the deposition of the plurality of polymer layers is made by additive manufacturing,
   wherein said cavity is formed along a median of said object and/or said outline is formed along the median of said object,
   wherein a first portion of the cavity has a first perimeter length defined along a first plane perpendicular to a depositing direction of the plurality of polymer layers, and a second portion of the same cavity has a second perimeter length defined along a second plane perpendicular to a depositing direction of the plurality of polymer layers, the first and second planes are different from each other and the first perimeter length and the second perimeter length being a different length,
   wherein the median is oriented perpendicular to the at least one receiving surface,
   wherein said object comprises an undercut along the median in said plurality of polymer layers, and the undercut is included in the outline delimited on the deposited adhesion layer,
   wherein after carrying out the surface treatment on the plurality of polymer layers and the deposited adhesion layer, a perimeter length of the adhesion layer is different from each of the first portion and the second portion,
   wherein the object includes at least one second surface,
   wherein each of the at least one first surface and the at least one second surface is defined by a curved outer perimeter,
   wherein the at least one second surface that is more curved than said at least one first surface, and
   wherein a perimeter length of at least one of the at least one first surface and the at least one second surface changes along the median of the object.

2. The deposition method according to claim 1, wherein said at least one finish layer comprises at least one material selected from among Au, Pt, Ag, Cr, Pd or an alloy of these materials.

3. The deposition method according to claim 1, wherein said surface treatment is carried out by pickling and/or stripping.

4. The deposition method according to claim 1, wherein said support is made of ceramic.

5. The deposition method according to claim 1, wherein said deposition of said adhesion layer is carried out in contact with said at least one receiving surface.

* * * * *